(12) United States Patent
Dockser

(10) Patent No.: US 7,386,747 B2
(45) Date of Patent: Jun. 10, 2008

(54) METHOD AND SYSTEM FOR REDUCING POWER CONSUMPTION OF A PROGRAMMABLE PROCESSOR

(75) Inventor: Kenneth Alan Dockser, Cary, NC (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 11/126,442

(22) Filed: May 10, 2005

(65) Prior Publication Data

US 2006/0259791 A1 Nov. 16, 2006

(51) Int. Cl.
*G06F 1/32* (2006.01)
(52) U.S. Cl. .................... 713/324; 713/320
(58) Field of Classification Search ........... 713/324
See application file for complete search history.

(56) References Cited

U.S. PATENT DOCUMENTS

| | | | | |
|---|---|---|---|---|
| 4,615,005 A | * | 9/1986 | Maejima et al. | 713/601 |
| 6,256,743 B1 | * | 7/2001 | Lin | 713/322 |
| 6,625,740 B1 | * | 9/2003 | Datar et al. | 713/324 |
| 6,845,445 B2 | | 1/2005 | Marchand et al. | 713/100 |
| 6,965,763 B2 | * | 11/2005 | Bussan et al. | 455/343.4 |
| 6,976,178 B1 | * | 12/2005 | Kissell | 713/300 |
| 7,082,543 B2 | * | 7/2006 | Lin | 713/320 |
| 2006/0123422 A1 | * | 6/2006 | Felter et al. | 718/105 |

* cited by examiner

*Primary Examiner*—Chun Cao
(74) *Attorney, Agent, or Firm*—Thomas Rouse; Nichoals J. Pauley; John L. Ciccozzi

(57) ABSTRACT

Control logic monitors use of a particular functional element (e.g., a divider, or multiplier or the like) in a programmable processor, and the control logic powers the unit down when it has not been used for a specified time period. A counter (local or central) and time threshold determine when the period has elapsed without use of the element. The control logic also monitors how soon the functional unit is woken up again, to determine if power control is causing thrashing. Upon the determination of such thrashing, the unit automatically adjusts its threshold period, to minimize thrashing. In an example of the logic, when it determines that it is being too conservative, it lowers the threshold. Mode bits may allow the programmer to override the power-down logic to either keep the logic always powered-up, or always powered-down.

20 Claims, 4 Drawing Sheets

METHOD AND SYSTEM FOR REDUCING POWER CONSUMPTION OF A PROGRAMMABLE PROCESSOR

TECHNICAL FIELD

The present teachings relate to techniques and processor architectures to efficiently provide complex processing logic with reduced power consumption when processing functions require less than the full processing capabilities.

BACKGROUND

Many devices utilize integrated processors, such as microprocessors and digital signal processors, with complex arrangements of logic for performing data processing functions in accord with program instructions. Many applications of these processors, for example in portable devices having battery power supplies, warrant careful control of power consumption, typically, to extend life of a charge in the battery power supply. Many functions or applications of the processor do not require the full processing capability of the processor device, or require the full processing capability only for a very limited time. If fully powered continuously, however, unused logic is unnecessarily consuming power.

Complementary Metal Oxide Semiconductor (CMOS) logic gates have traditionally been very good at minimizing power consumed by idle elements as they only consume dynamic power when a circuit is actively switching. However, they also have a static, or leakage, component to their power consumption. Commonly, the dynamic component has largely outweighed the static. However, in newer deep-submicron technologies, the static component is starting to contribute a significant amount to the overall power consumption. In order to be power efficient, modern devices may need to actively limit the amount of static power dissipated.

To achieve power reduction, for battery-powered embedded applications like cell phones, attempts have been made to power down unused portions of logic, thereby removing the leakage power loss. Some have relied upon software control to turn off unused logic components. For this purpose, instructions in the program may turn certain processor elements on when they will be needed and off when not needed. While this results in power savings, it imposes additional overhead on the software and requires the programmer to actively control various processor functions.

Automated systems may be used to shut down an unused component after a given amount of time. However, cases arise where time-based powering down of a logic element is potentially problematic. Waking or powering up the component can result in additional power consumption. In some cases, it takes more to power-up the element than to just keep the element on for some short period of time. Also, it takes time to power a component back up. The resulting delay or latency in restarting the component my result in processor stalls, which degrades performance.

Therefore, it is desirable to ensure that the component is not repeatedly powered down only to be powered up a short while later. Repeated power-down and power-up may be termed "thrashing." A need exists for a technique to selectively control power to an element of a processor, so as to effectively reduce power consumption yet avoid undue thrashing.

SUMMARY

In one aspect, the teachings of the present disclosure relate to a method of reducing power consumption of a programmable processor. The method involves monitoring time since a last call for an operation of one of the functional units of the programmable processor. The time since a last prior shut down of the unit also is monitored. When the time since the last call exceeds a current threshold, this method shuts down the one functional unit, so as to reduce power consumed by the one functional unit. The unit is reactivated in response to a later call for operation of the one functional unit. The method also includes adjusting the threshold. At the time of reactivating the one functional unit, if the time since the shutting down is less than a set value, the method increases the current threshold to a new higher threshold.

For example, the set value may be equal to the current interval value used as the threshold. If the time from shut down to next call is short, e.g. less than the old threshold, the increase in the threshold helps to reduce future thrashing. The threshold may also be incrementally adjusted, typically as a decrease in the time threshold, in response to the interval since the last prior call. The incremental decreasing helps to optimize power conservation.

Other aspects of the present teachings relate to a power control and/or to a processor using power control with threshold adjustment.

The power control might include circuitry coupled to one of the functional units, for selectively activating and shutting down the one functional unit. The control includes means for monitoring time. Specifically, time is monitored both since a last prior call for operation of the one functional unit and since a last prior shutting down of the unit. Control means shut down the one functional unit if time since last call for operation of the functional unit exceeds a current value of a threshold. The control means also serves to increase the value of the threshold over its current value, if a call for the one functional unit occurs in a time since last prior shutting down of less than a set value.

A processor aspect of the present teachings might include functional units for processing data in accord with instructions and circuitry coupled to one of those units, for selectively activating and shutting down the one functional unit. A power controller monitors calls for operation of the one functional unit during the processing of instructions and controls the circuitry to shut down the unit. The controller shuts down the one functional unit upon each passage of a time interval since a last prior one of the calls equal to an adjustable threshold. The controller also reactivates the functional unit in response to each new call for operation of the one functional unit following a shut down. Means also are provided for adjusting the threshold.

The disclosed example includes control logic which monitors the use of a particular functional element (e.g., a divider, or multiplier or the like) and powers the unit down when it has not been used for a specified time period. A time stamp is stored each time there is a call for unit operation. The logic employs a counter (local or central) to determine when a set period has elapsed without use of the element. The logic also stores a time stamp for each shut down and monitors how soon the logic is woken up again to determine if power control is causing thrashing. Upon the determination of such thrashing, the unit automatically adjusts its threshold period, to minimize thrashing. Likewise, when the logic determines that it is being too conservative, it incrementally lowers the threshold. Mode bits exist to allow the programmer to override the power-down logic to either keep the logic always powered-up, or always powered-down.

Hence, the exemplary technique allows the hardware to dynamically reduce leakage-based power consumption based on the timing of activity of specific functional units. The anti-thrashing logic ensures that the efforts to reduce power do not cause undue power consumption or processor stalls due to excessive re-cycling. However, when not thrashing, the incremental adjustment helps to optimize power conservation.

Additional advantages and novel features will be set forth in part in the description which follows, and will become apparent to those skilled in the art upon examination of the following and the accompanying drawings or may be learned by production or operation of the examples. The advantages of the present teachings may be realized and attained by practice or use of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

The various examples of processor architecture and processing flows described below control operation of a particular functional unit (e.g., a divider, or multiplier or the like) based on monitored calls for operation of that unit, for example, to power the functional unit down when it has not been used (e.g. no new call) for some period. The period or threshold time setting, however, is adjusted based on usage of the element. The threshold adjustment can decrease the threshold gradually, to further improve power consumption, as the controlled element is used less often. To prevent thrashing, if an instruction recalls the unit in a short period following a shut down, e.g. in a period less than the current threshold setting, then the processor adjusts the threshold to increase the idle period before subsequent cut-off.

Reference now is made in detail to the examples illustrated in the accompanying drawings and discussed below.

Figure 1:
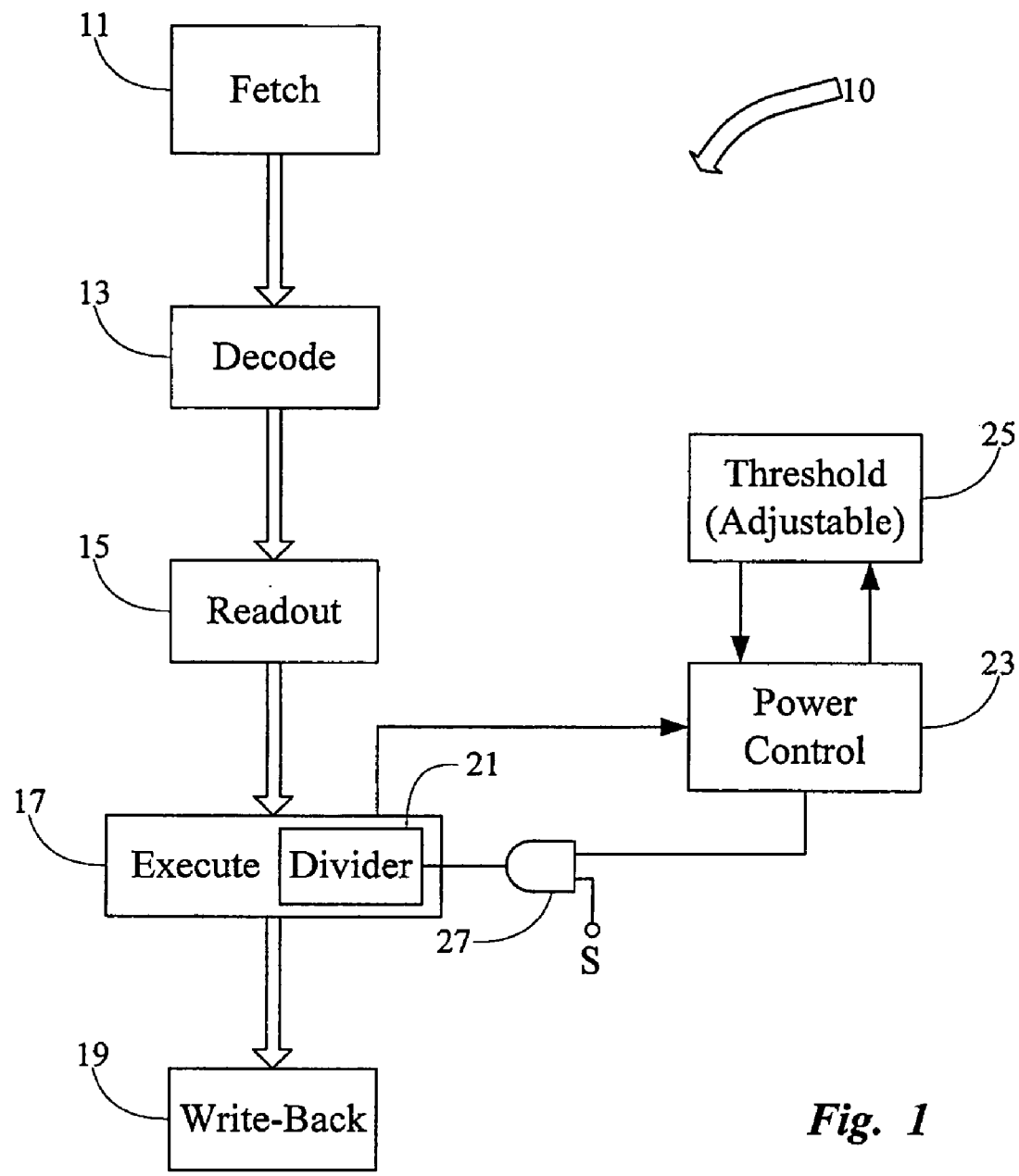
FIG. 1 is a simplified block diagram of a pipelined processor, with adjustable control of a functional unit of the processor.

The power control principles discussed herein are adaptable to a variety of different processor architectures. However, to facilitate understanding, it may be helpful to consider a pipelined processor as an example. FIG. 1 is a simplified block diagram of a pipelined processor 10. The processor 10 is intended for low-power applications, e.g. in mobile telephone stations or other portable electronic devices utilizing battery power. In such applications, the technique is applicable to the main processor or to a numeric coprocessor, such as a single instruction-multiple data (SIMD) processor for multimedia processing.

For ease of discussion, the example of a pipeline 10 is a scalar design, essentially implementing a single pipeline. Those skilled in the art will understand, however, that the processing discussed herein also is applicable to superscalar designs and other architectures implementing multiple pipelines. Also, the depth of the pipeline (e.g. number of stages) is illustrative only. An actual pipeline may have fewer stages or more stages than the pipeline 10 in the example.

The simplified pipeline 10 includes five major categories of pipeline processing stages: Fetch 11, Decode 13, Readout 15, Execute 17 and Write-back 19. The arrows in the diagram represent logical data flows, not necessarily physical connections. Those skilled in the art will recognize that any of these stages may be broken down into multiple stages performing portions of the relevant function, or that the pipeline may include additional stages for providing additional functionality. Although not shown separately in FIG. 1, each stage of the pipeline 10 typically comprises a state machine or the like implementing the relevant logic functions and an associated register for passing the instruction and/or any processing results to the next stage or to other processor resources.

In the exemplary pipeline 10, the first stage is the instruction Fetch stage 11. The Fetch stage 11 obtains instructions for processing by later stages. The Fetch stage 11 obtains the instructions from a hierarchy of memories (not shown), which typically include an instruction or level 1 (L1) cache, a level 2 (L2) cache and main memory. The Fetch stage 11 supplies each instruction to a Decode stage 13. Logic of the instruction Decode stage 13 decodes the instruction bytes received and supplies the result to the next stage of the pipeline.

The next major category of stages provides data access or Readout. Logic of the Readout stage 15 accesses operand data in specified registers in a general purpose register or "GPR" file (not shown). Each instruction and its required operand data are passed to one or more stages 17 providing the Execute function. The Execute stage(s) 17 essentially execute the particular function of each instruction on the retrieved operand data and produce a result. The stage or stages 17 providing the Execute function may, for example implement an arithmetic logic unit (ALU). The Execute stage 17 supplies the result or results of execution of each instruction to the Write-back stage 19. The stage 19 writes the results back to a register or to memory.

The elements of the processor 10 draw power even when they are not switching. In many applications, e.g. using battery power sources, the life of the power source is limited. Some elements of the processor 10 are not continually used. Some functional units, in the Execute stage 17 in the example, may not be needed for substantial periods of time. To reduce power consumption, each such functional unit can be shut down when not needed. For discussion purposes, the functional unit that will be the subject of the power control is a divider 21, although those skilled in the art will recognize that similar control may be applied to a multiplier or any of a variety of other functional elements or resources of the Execute stage 17 or elsewhere in the processor 10.

The example includes a power control 23, which monitors calls and operation of a particular functional unit (e.g. the divider 21 ). Control 23 powers the unit down when it has not been called for a period of time defined by an adjustable threshold in register 25. The power control 23 determines when a set period has elapsed without a call for use of the divider 21, that is to say when the period of inactivity of the element 21 meets or exceeds the threshold 25. As will be discussed more later, the power control 23 also monitors how soon the functional unit, in this case the divider 21, is powered up again after each power-down to determine if power control is causing thrashing. Upon the determination of such thrashing, the power control 23 automatically adjusts its threshold period upward, to minimize thrashing. Likewise, when the power control 23 determines that it is being too conservative, it lowers the threshold 25. Mode bits exist to allow the programmer to override the power-down logic to either keep the unit always powered-up, or always powered-down.

The active status of the controlled functional unit, that is to say the divider 21 in the example of FIG. 1, can be controlled in response to selection signals from the power control 23 in any of a variety of known ways. For purposes of general discussion, FIG. 1 shows a signal (S) needed for operation of the divider 21, and a generic gate circuit 27 for selectively coupling the signal to the divider in response to a power control signals from the power control 23. The circuit shown generically at 27 in FIG. 1 may be a logic gate, a switch, a combination thereof, or any other circuit configured to supply the appropriate type of signal to the functional unit in response to appropriate selection signals from the control 23. Supplying the signal S to unit 21 activates or powers-up the unit; whereas interrupting or withdrawing the signal S shuts down the unit 21.

For example, the divider 21 can be selectively enabled and disabled by controlled gating of the supply of power to the divider 21, such that operation of the gate 27 turns power on and off in accord with calls for usage. In such an implementation, the signal S would represent one of the power supply terminals or voltages. When the power control 23 disables the divider 21, the control 23 triggers the gate 27 to cut off a connection to one of the power terminals S (e.g. supply or ground) with respect to the circuitry of the divider 21. The cut-off eliminates dynamic power consumption and leakage through the circuitry of that functional unit.

The example of FIG. 1 shows a single functional unit, the divider 21, controlled based on calls for its usage. Those skilled in the art will recognize that a given processor may include several similar controls for a number of elements that draw substantial power but may be inactive for considerable periods of time.

Figure 2:
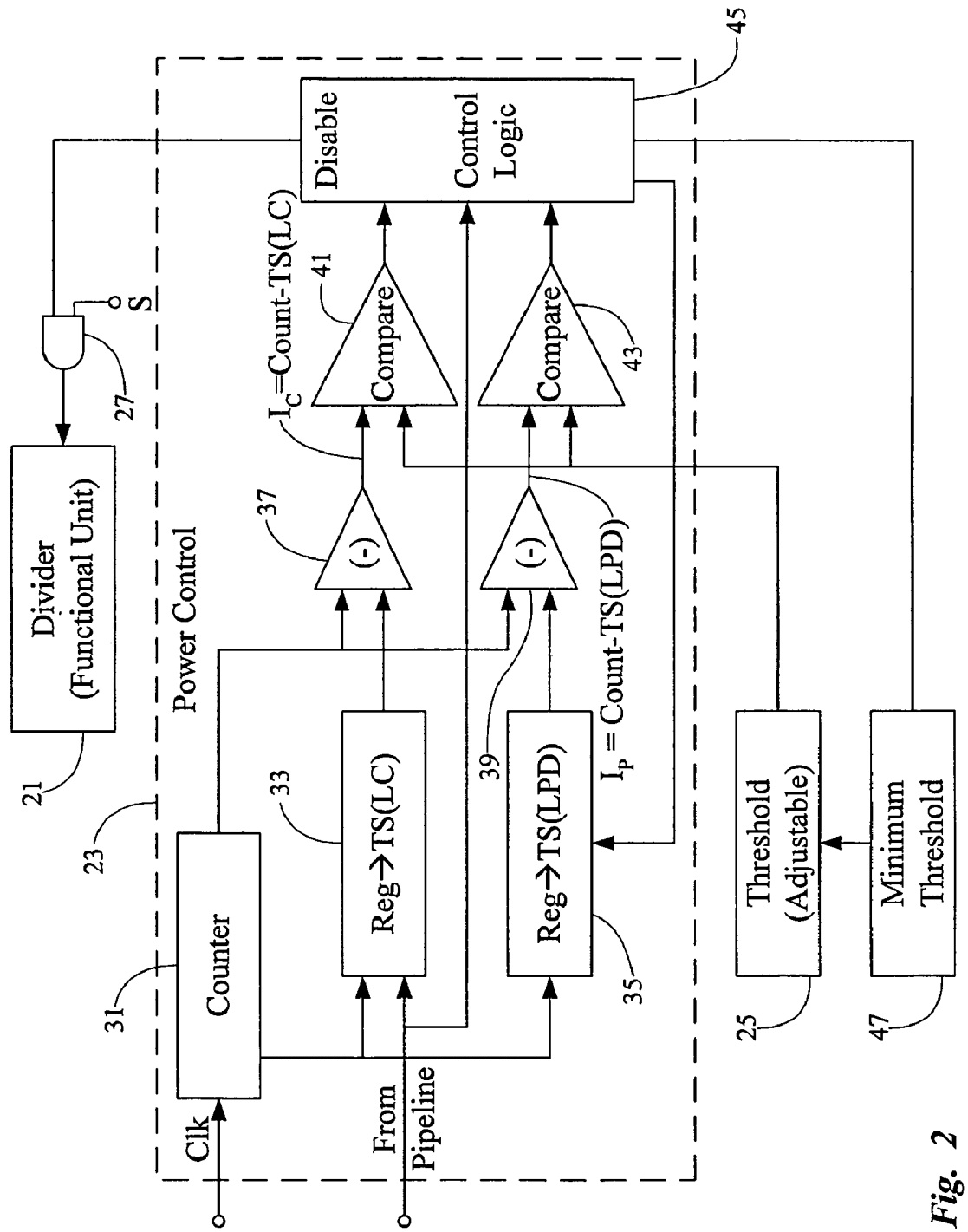
FIG. 2 is a functional block diagram of an example of a power control, for controlling activation of a divider, based on an adjustable time threshold.

FIG. 2 is a functional block diagram of an implementation of the power control 23, for controlling activation of the divider 21 based on an adjustable threshold in register 25. In this example, the power control 23 includes a counter 31 responsive to a clock signal. The counter 31 may utilize the system clock or another clock signal generated in or for the processor 10. The counter 31 can be shared amongst several functional units, or dedicated to the functional unit in question. The count is in units of time reasonable for the functional unit. It can range from cycles to seconds (or beyond). The power control 23 also includes two time stamp (TS) registers 33 and 35. When activated, a register 33 or 35 stores the current count from the counter 31, representing a measure or value related to the current time.

The register 33 is activated to store the current time count value from the counter 31, each time that the functional unit (divider 21 in our example) is called by an instruction flowing through the pipelined processor 10. The register 33 holds that count until the unit is called again. In this way, the value TS(LC) in the register 33 represents a time stamp for the last (most recent) call for operation of the divider 21.

The register 35 is activated to store the current time count value from the counter 31, each time that the functional unit (divider 21 in our example) is powered down. The register holds that count until the unit is shut off again. In this way, the value TS(LPD) in the register 33 represents a time stamp for the last power down (most recent deactivation) of the divider 21.

The counter 31 also supplies counts related to running time to two subtraction circuits 37 and 39. When operated, the subtraction circuit 37 also receives the last call time stamp value TS(LC) from the register 33. The difference $I_C$ between the counter (related to current time) and the stored count value TS(LC) represents the interdelay interval since the last prior call for the divider 21. A comparator 41 compares the interdelay interval since the last call $I_C$ to the current value of the adjustable threshold 25. In this way, the counter value is subtracted from the data in the register 33 and compared to the current threshold as registered at 25. Alternatively, this can be done by subtracting the old time stamp in register 33 and the threshold 25 from the current value of counter 31, in which case, a zero or negative result means a period equal to the threshold has passed since the last call for the divider 21.

If $I_C$ reaches (i.e., meets or exceeds) the current value of the threshold 25, then control logic 45 disables the gate 27, to cut-off the divider 21. When the control logic deactivates the divider 35, it also causes the register 35 to store a new count from counter 31, as the last power down time stamp value TS(LPD). The control logic powers up the divider 21 in response to a later call for the divider 21.

The second subtraction circuit 39 receives the last power down time stamp value TS(LPD) from the register 35. The difference $I_p$ between the value in counter 31 (related to current time) and the stored count value TS(LPD) represents the interdelay interval since the divider 21 was last powered down. A comparator 43 compares the interval since the last power down $I_p$ to a set value, in this example the current value of the adjustable threshold 25, and supplies the result to the control logic 45. The control logic 45 uses this comparison result in its internal algorithm for adjusting the threshold 25 to avoid thrashing. Alternatively, this comparison can be done by subtracting the old time stamp in register 35 and the threshold 25 from the current value of counter 31, in which case, a positive result means that a period less than the threshold has passed since last power-down. The subtraction circuit 37 and comparator 41 are triggered when the divider is called or powered-up, as part of the processing to adjust the threshold 25.

The algorithm implemented by the control logic 45 to adjust the period used for the shut down based on usage is intended to optimize power consumption yet minimize thrashing. For example, if the control 23 did not wait long enough before shutting down the divider 21 the last time, the logic 45 extends the threshold used as the measure of the period of inactivity for the next power cycle with respect to the particular functional unit. However, the algorithm also decreases the threshold a bit (tweaking), e.g. each time it calls the function where the intercall delay was longer than the threshold.

First consider the operations that may be involved in tweaking the threshold downward, to further reduce power consumption.

A minimum shutdown threshold is hardwired or loaded by software into the Minimum Threshold register 47. The initial threshold (i.e., Tho) value in register 47 is the minimum value read from register 25. Typically, the minimum threshold is set to the value where the shutoff power savings (leakage) equals the power-up cost, although the minimum may be set lower than this value. It could also be set greater, to take into account the cost of delay (e.g., stalls, flush & re-fetch) induced in the instruction flow waiting for startup of the controlled functional unit.

When the functional unit (e.g. divider 21) is called or is powered down, the value in the current value of counter 31 is captured in the appropriate register 33 or 35 as a time stamp. Also, when the functional unit is called or the unit is powered up again, the current value of counter 31 is subtracted from the data in the appropriate register and compared to the current threshold, e.g. using the subtracting circuits and comparators discussed above. Alternatively, this can be done by subtracting the respective time stamp and the threshold from the current counter value—a negative value means the event occurred sooner than a threshold interval away from the last event.

Essentially, each time that the power control 23 detects a new call for the functional unit, the power control runs two algorithms for adjusting the threshold value in register 25. One algorithm provides minor adjustments or tweaking, to optimize power conservation by the control 23. The other algorithm provides larger adjustments, for minimizing thrashing.

For the tweaking, every time there is a call for the function of the unit, e.g. for division by unit 21, it is determined how long it has been since the last call by comparing time stamps (counter output) for the calls. This value $I_C$, for interdelay between calls, is subtracted from the old threshold $Th_n$, and the difference ($\Delta$) is shifted to the right by a constant value, e.g. 3 places, essentially as if dividing by the corresponding power of two. This result is subtracted from the old threshold value $Th_n$, to produce a new threshold $Th_{n+1}$. An example of such a formula for adjusting the threshold would be as follows:

$$Th_n - \frac{Th_n - I_C}{2^x} = Th_{n+1}. \quad (1)$$

Based on such a computation, the control logic 45 adjusts the threshold value in register 25. This processing in response to the interval between calls produces a gradual adjustment of the threshold. Since a very large interdelay $I_C$ could cause big changes in the threshold, the difference ($\Delta$) could be saturated to a maximum value (e.g., the previous threshold $Th_n$) so that no single reading could unduly affect the threshold. Thus, for example, the new threshold could always be kept within the range of:

$$Th_n - \frac{Th_n}{2^x} \leq Th_{n+1} \leq Th_n + \frac{Th_n}{2^x}.$$

Since very large values of $I_C$ are conducive to power savings, the threshold could actually be reduced (rather than increased) by $$\frac{Th_n}{2^x}$$

in such cases; for purposes of this example, a very large value of Ic could be defined as $>Th_n 2^x$. Furthermore, the minimum threshold could be used as a limit on decreasing of the threshold.

Assume as a first example, that the functional unit was on, and the time since the last call has not passed the current threshold $Th_n$ when another call is received. In this example, the control logic 45 has kept the functional unit 21 powered-on. When the new call for the unit is received, the interdelay $I_C$ is less than the current threshold $Th_n$. The difference between $Th_n$ and $I_C$ would be a positive $\Delta$ value. Hence, the new Threshold $Th_{n+1}$ would be reduced or smaller than the old threshold $Th_n$, by the amount of $\Delta$ shifted by x places (divided by $2^x$). Stated another way, the power control has not been aggressive enough, so it incrementally reduces the threshold in an effort to cut the unit off (saving power) earlier in future.

Assume as a second example, that time since the last call has passed the current threshold, and the control logic 45 has turned-off the functional unit 21. When the unit is called next, the interdelay $I_C$ is larger than the current threshold $Th_n$. If there is no thrashing, $I_p$ is greater than or equal to $Th_n$, so Ic is at least twice the current threshold value $Th_n$. The difference would be a negative $\Delta$ value. Hence, the new threshold $Th_{n+1}$ in formula (1) would be increased or larger than the old threshold $Th_n$, by the amount of $\Delta$ shifted by x places (divided by $2^x$). However, if the interdelay $I_C$ were particularly large, the power control would reduce the new threshold in the example from $Th_{n+1}$ to $Th_n(1-\frac{1}{2}^x)$.

The control logic 45 also adjusts the threshold value in register 25 to minimize thrashing. Thrashing occurs if, after a power down, a new call comes for the operation of the functional unit too soon, e.g. so that power-up consumes more power than was saved by the power down and/or stalls added due to power up delay significantly affect performance. If the function of the unit in question has been powered off, when it is called for again and powered back up, the time of enablement is compared to the power-off time stamp TS(LPD).

In the example of FIG. 2, when the control logic 45 powers up the divider 21 in response to a new call for its operation, the logic reads the comparison of the count value in counter 31 to the combination of the time stamp in register 35 and the threshold value in register 25. The same threshold is used here for convenience, although a different set time value could be used in this adjustment algorithm. If the measured time interval since last power down is too small (e.g., the period of delay between power down and power up is less than or equal to the threshold), the threshold is adjusted in a manner intended to reduce future potential for thrashing. This adjustment increases the threshold for future use, for example to twice the old threshold. Thus, the anti-thrashing component has more of a direct effect on the threshold, whereas the tweaking component has a more watered-down effect.

Figure 3:
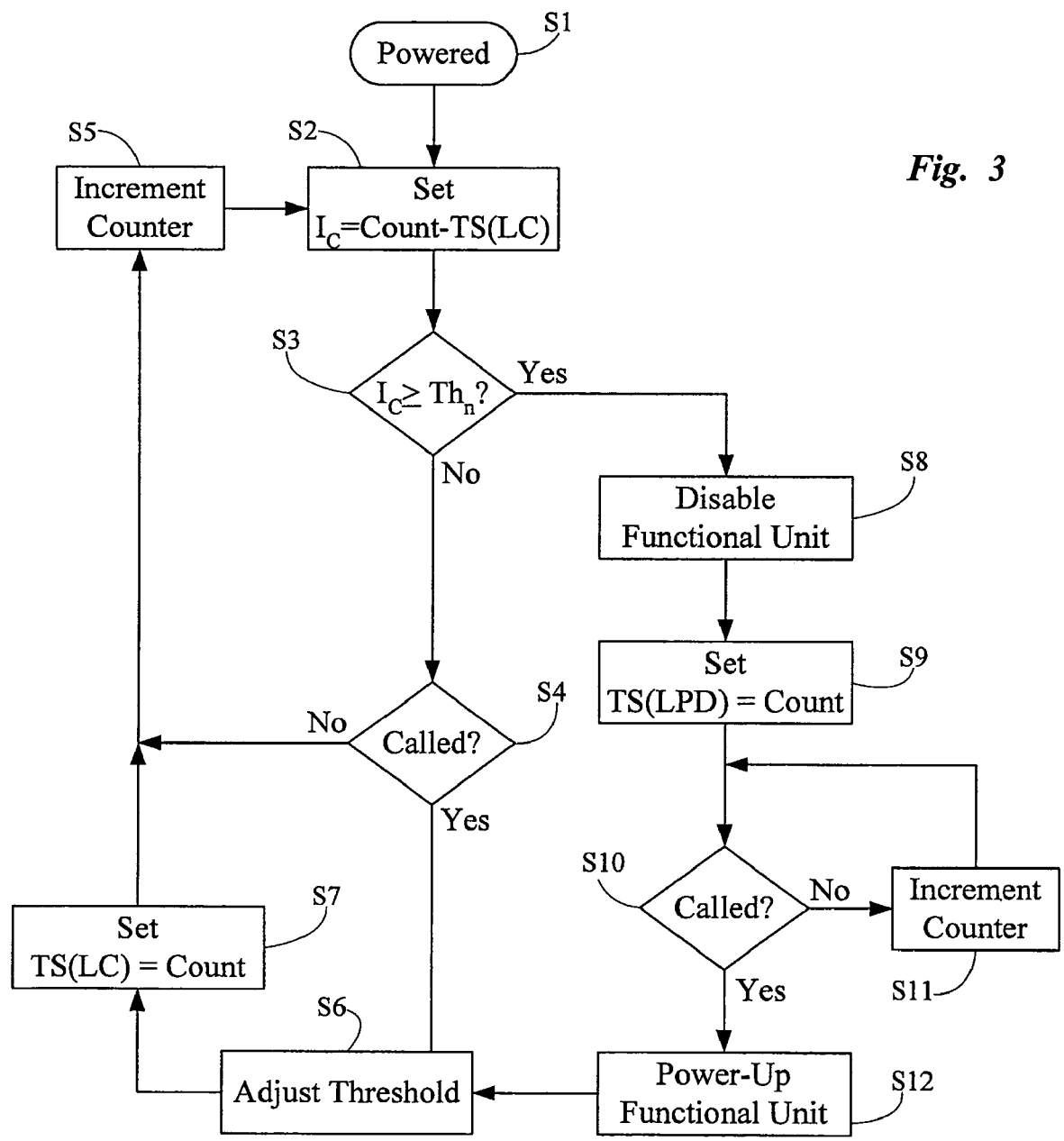
FIG. 3 is a flow chart of a simple example of the processing to activate and deactivate a functional unit of the processor, based on timing regarding activity of the unit and an adjustable time threshold.

The processing to control activation and deactivation of a functional element of a processor based on inactivity and to adjust the inactivity time threshold may be implemented in a variety of ways. However, it may be helpful to consider an example of a logical flow of processing in accord with the operations outlined above. xyz FIG. 3 is a flow chart illustrating an example of the process flow that might be implemented by the power control 23.

When the divider 21 is already powered (at S1), the inter-call delay $I_C$ since the last previous call for operation of the divider 21 is calculated in step S2. Using the register 33 and the subtraction circuit 37, for example, step S2 computes $I_C$=Count−TS(LC). A step S3 entails comparison to the current threshold value $Th_n$ (e.g. as in comparator 41). If the control logic 45 determines that the inactivity delay since the last call $I_C$ does not meet or exceed the current threshold value $Th_n$, processing at step S3 flows to step S4.

In step S4, the control logic 45 checks for a call for operation of the divider 21. If there is no call, then the processing at step S4 flows to step S5. In step S5, the counter is incremented and processing returns to step S2 to update the value for the interdelay since the last call and to check that delay again against the current threshold value at S3.

Assume for discussion purposes at this point that the loop through steps S2 to S5 continues until the power control detects a call for operation of the divider 21. Hence, at step S4, the control logic 45 detects the call for the divider 21, and the process flows from step S4 to step S6. In step S6, the control logic implements a routine to adjust the threshold value, as will be discussed later, with regard to the flow chart of FIG. 4. Of note, since the unit has not been powered down, at this point in the example the adjustment incrementally decreases the threshold for future use. After adjustment of the threshold, processing involves updating the time stamp TS(LC) in register 33 (step S7) to the current value in the counter 31 in the cycle in which the control 23 received or detected the call for the divider 21. Step 5 again increments the counter, and processing returns to step S2 to resume the analysis based on the interdelay $I_C$ since the last call for the function of the divider 21.

The loops through steps S2 to S7 will continue so long as the control logic 45 receives a new call for the function of the divider 21 before an expiration of a period of the interdelay $I_C$ since the last call for the function of the divider 21 equal to or greater than a current value $Th_n$ of the threshold. However, assume now that the delay since the last call reaches the current threshold value. Hence, at step S3, the control logic 45 detects that $I_C \geq Th_n$, and it causes the processing to flow from step S3 to S8. In step S8, the control logic 45 disables the divider 21, e.g. by cutting power to the divider 21 as discussed earlier. The control logic 45 then (at S9) activates the register 35 to capture the current count value as the new time stamp value TS(LPD) for the last power down of the divider 21.

At step S10, the control logic looks to see if it has received or detected a new call for the function of the divider 21. If not, processing flows to step S11 in which the counter is incremented, processing flows back to step S10. Steps S10 and S11 repeat until the control logic 45 detects a new call for the function of the divider 21. Until a new call is detected, the divider 21 remains disabled and thus consumes no power.

However, when the control logic 45 detects a new call for the function of the divider 21, processing flows from S10 to S12. At S12, the control logic 45 initiates the procedure for powering up the functional unit, that is to say the divider 21 in our example. Processing then flows to step S6 to adjust the threshold, either to tweak the threshold or to increase the threshold to avoid thrashing, depending on the length of time between calls. In step S7, the logic 45 sets the time stamp for the latest call TS(LC) to the current value in the counter 31. Processing then flows back through step S5 to step S2 to resume the processing discussed earlier.

As shown by FIG. 3 and the description thereof in the preceding paragraphs, each time there is call for the operation of the functional unit, the control logic 45 will initiate a procedure at step S6 to adjust the threshold. The processing at S6 to adjust the threshold in accord with the principles outlined above may be implemented in a variety of ways. However, it may be helpful to consider an example of a logical flow of processing in accord with the operations outlined above, with regard to the flow chart of FIG. 4.

At step S61, the interval $I_P$ since the last power down of the divider 21 is calculated. Using the register 35 and the subtraction circuit 39, for example, step S61 computes $I_P$=Count−TS(LPD). At step S62 the logic 45 determines if this adjustment operation followed a power-up of the divider 21. If so, processing flows from S62 to S63. Step S63 entails comparison to a set value used to measure thrashing, e.g. to the old threshold value $Th_n$ (e.g. as in comparator 43). If the control logic 45 determines that the interval $I_P$ since the last power down is less than the old threshold value $Th_n$, then there is a thrashing issue, so processing at step S63 flows to step S64.

In step S64, the threshold is increased to reduce thrashing. This adjustment at S64 can produce an increased threshold equal to, for example, twice the old threshold ($Th_{n+1}$=2 ($Th_n$)). Hence, upon detecting a thrashing condition, the power down threshold may be doubled, to prevent early power down of the divider in future cycles.

Returning to step S62, if the functional unit was not powered up in response to the new call (the threshold interval since last prior call had not expired) processing would flow to S65. Processing may also reach S65 if there is a power-up in response to the new call but the interval $I_P$ since the last power down was greater than or equal to the old threshold value. This means that the period since the last prior call is also larger than the threshold (since the last prior call preceded the last prior power down) and the functional unit was powered up in step S12 on this pass through the process flow of FIG. 3. In either case, there is no thrashing issue, but the threshold may need to be tweaked to optimize power conservation.

As noted, very large values of $I_C$ are conducive to power savings. In this example, a very large value of Ic is defined as $>Th_n 2^x$, and the logic checks the interdelay against that defining value in step S65. If the interdelay $I_C > Th_n 2^x$, processing flows to step S66 in which the threshold is reduced by $$\frac{Th_n}{2^x}$$

(the old binary value shifted to the left by x places, e.g. by one, two, three or more places). Next, processing flows to step S67, to check the reduced threshold value against the minimum threshold value. If the computed new threshold value $Th_{n+1}$ would be less than the minimum threshold $Th_{min}$, then step S68 serves to set the new threshold to the minimum value. If not, then the processing exits the adjustment routine S6 with the new threshold set to the value computed in step S66.

Return now to consideration of step S65. where it was determined whether the interdelay interval $I_C$ was relatively large. If not, then processing flows to step S69. There, the current value $I_C$, for interdelay between calls for operation of the divider unit 21, is subtracted from the old threshold $Th_n$, the difference is shifted to the right by a constant value, e.g. 3 places (x=3), essentially as if dividing by the corresponding power of 2. This result is subtracted from the old threshold value $Th_n$, to produce a new threshold $Th_{n+1}$. As discussed above, an example of this formula for adjusting the threshold would be as follows:

$$Th_n - \frac{Th_n - I_C}{2^x} = Th_{n+1}. \quad (1)$$

Since a very large interdelay $I_C$ could cause big changes in the threshold, the difference ($\Delta$) between the threshold and the interdelay could be saturated to a maximum value (e.g., the previous threshold $Th_n$) so that no single reading could unduly affect the threshold. Thus, for example, the new threshold could always be kept within the range of:

$$Th_n - \frac{Th_n}{2^x} \leq Th_{n+1} \leq Th_n + \frac{Th_n}{2^x},$$

as represented by the limiting steps S70 and S71.

Step S66 compares the new threshold to twice the old threshold. If the new threshold computed in step S64 is more than twice the old threshold, processing flows to step S64 to set the new threshold to twice the old threshold. If the new threshold computed in step S65 is less than or equal to (not more than) twice the old threshold, the processing flows to step S67, to check the tweaked threshold value against the minimum threshold value. If the computed new threshold value $Th_{n+1}$ would be less than the minimum threshold $Th_{min}$, then step S68 serves to set the new threshold to the minimum value. If not, then the processing exits the adjustment routine S6 with the new threshold set to the value computed in steps S69 to S70.

Figure 4:
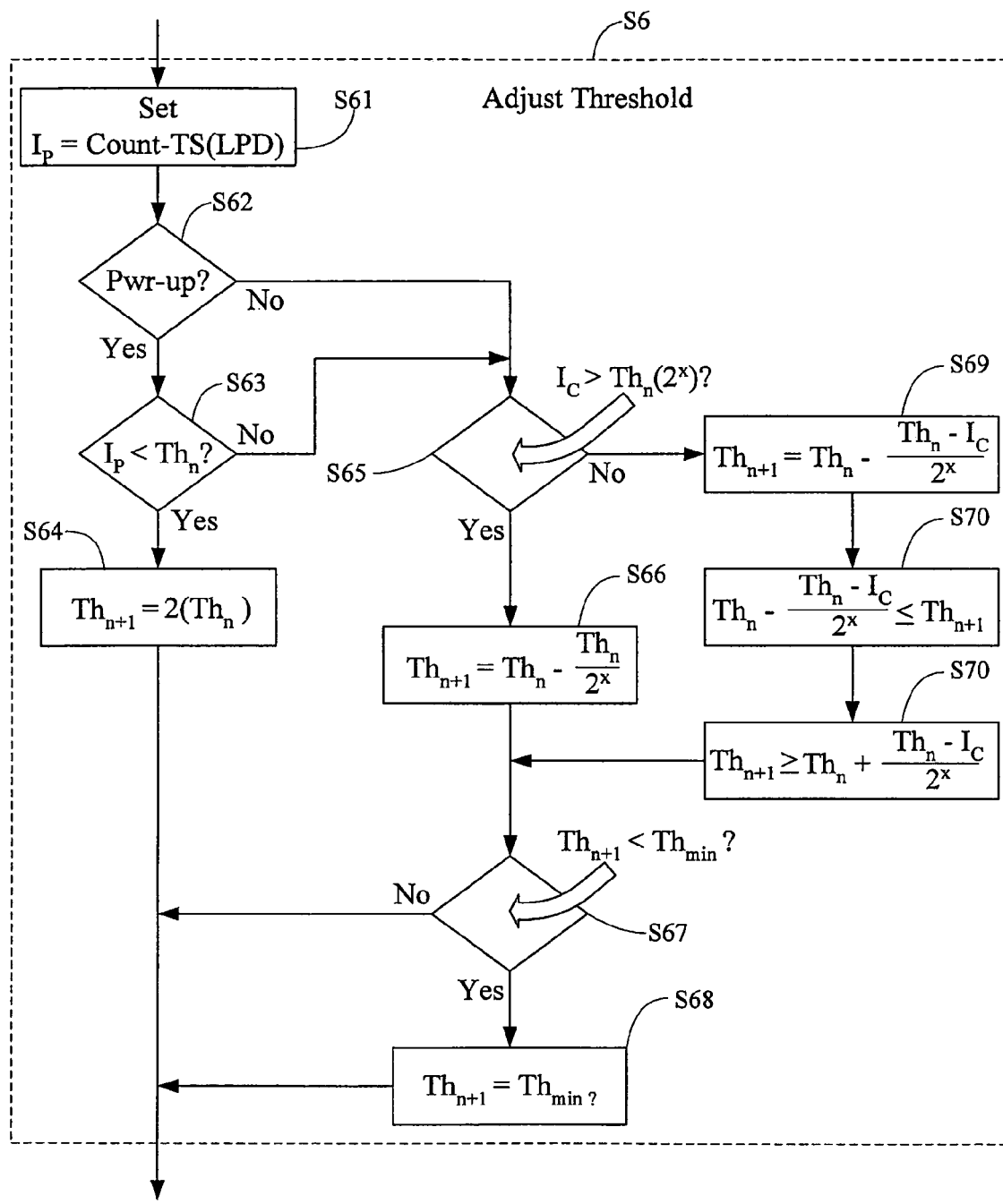
FIG. 4 is a flow chart of an example of the processing that may be used to adjust the threshold, to optimize power conservation while controlling thrashing.

The processing flow of FIG. 3 and the adjustment routine of FIG. 4 are given by way of example, only. Those skilled in the art will recognize that other routines and/or other algorithms may be used to implement the present teachings for power conservation while avoiding undue thrashing.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of reducing power consumption of a programmable processor comprising:
    monitoring time since a last call for an operation of one of a plurality of functional units of the programmable processor;
    monitoring time since a last prior shut down of the one functional unit;
    when the time since the last call exceeds a current threshold value, shutting down the one functional unit, so as to reduce power consumed by the one functional unit;
    reactivating the one functional unit in response to a later call for operation of the one functional unit; and
    if at the time of reactivating the one functional unit, the time since the shutting down is less than a set value, increasing the current threshold value to a new higher threshold value.

2. The method of claim 1, wherein the set value equals the current value of the threshold.

3. The method of claim 1, wherein the new higher threshold value is twice the current threshold value.

4. The method of claim 1, further comprising adjusting the current threshold value to optimize power reduction based on the time since the last call for operation of the one functional unit, upon shutting down the one functional unit.

5. The method of claim 4, wherein the adjusting of the current threshold value to optimize power reduction comprises calculating an adjusted threshold value by performing steps comprising:
    subtracting the time since the last call from the current threshold value to obtain a difference;
    shifting the difference by one or more bit positions; and
    subtracting the shifted difference from the current threshold value to obtain the adjusted threshold value.

6. The method of claim 5, wherein the calculating of the adjusted threshold value further comprises saturating the difference to no more than the current threshold value and limiting the adjusted threshold value to no less than a set minimum threshold value.

7. The method of claim 1, wherein the functional unit comprises a logic element for execution of an arithmetic function.

8. The method of claim 7, wherein the arithmetic function comprises a multiply or a divide function.

9. A method of reducing power consumption of a programmable processor comprising:
    monitoring calls for an operation of one of a plurality of functional units of the programmable processor;
    shutting down the one functional unit in response to each detection of the time following a last preceding one of the calls reaching a current value of a threshold before a subsequent one of the calls;
    activating the one functional unit in response to a call for operation of the one functional unit following each shutting down of the one functional unit;
    monitoring time between each shutting down of the one functional unit and each subsequent activation of the one functional unit; and
    increasing the threshold value to a new current value, in response to an occurrence of when a time between a shutting down of the one functional unit and a subsequent activation of the one functional unit is less than a set period.

10. The method of claim 9, wherein the set period equals the current value of the threshold.

11. A power control system for a programmable processor comprising a plurality of functional units, the power control system comprising:
    circuitry coupled to one of the functional units, configured to selectively activate and to shut down the one functional unit;
    means for monitoring time since a last prior call for an operation of the one functional unit and time since a last prior shutting down of the one functional unit;
    means for controlling the circuitry, to shut down the one functional unit upon each occurrence of when the time since the last prior call for operation of the one functional unit exceeds a current value of a threshold, and to increase the value of the threshold over its current value if a call for the one functional unit occurs in a time since the last prior shutting down of less than a set value.

12. The power control system as in claim 11, wherein the set value equals the current value of the threshold.

13. The power control system as in claim 12, wherein the increasing of the threshold value comprises setting a new threshold value equal to double the current value of the threshold.

14. The power control system as in claim 11, further comprising means for adjusting the threshold value as a function of time since the last call for the one functional unit, upon each shut down of the one functional unit.

15. A programmable processor, comprising:
a plurality of functional units configured to process data in accordance with instructions;
circuitry coupled to one of the functional units, configured to selectively activate and shut down the one functional unit;
a power controller, configured to monitor calls for operation of the one functional unit during the processing of instructions, and configured to control the circuitry to shut down the one functional unit upon each occurrence of when a time since a last prior one of the calls is equal to an adjustable threshold value and to reactivate the one functional unit in response to each new call for operation of the one functional unit following a shut down; and
means for adjusting the threshold value as a function of time between a shut down of the one functional unit and a subsequent call.

16. The programmable processor as in claim 15, wherein the means for adjusting is configured to control an increase of the threshold value as a function of time between the shut down of the one functional unit and the subsequent call for the operation of the one functional unit.

17. The programmable processor as in claim 15, wherein the means for adjusting is configured to control a decrease of the threshold value as a function of time since a last call for the operation of the one functional unit, in response to a subsequent call for operation of the one functional unit.

18. The programmable processor as in claim 15, wherein:
the means for adjusting is configured to increase the threshold value if time between the shut down of the one functional unit and the subsequent call for the operation of the one functional unit is less than a set value; otherwise
the means for adjusting is configured to adjust the threshold value as a function of time since a last call for the operation of the one functional unit.

19. The processor of claim 15, wherein the functional units form a plurality of processing stages of a pipeline, the stages include an execution stage, and the one functional unit comprises an element of the execution stage.

20. The processor of claim 19, wherein the element of the execution stage comprises a divider or a multiplier.

* * * * *